United States Patent
Kim et al.

(10) Patent No.: US 10,849,094 B2
(45) Date of Patent: Nov. 24, 2020

(54) METHOD FOR UE CONTEXT MANAGEMENT AND DEVICE FOR SUPPORTING SAME

(71) Applicant: LG Electronics Inc., Seoul (KR)

(72) Inventors: Seokjung Kim, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,690

(22) PCT Filed: Sep. 28, 2017

(86) PCT No.: PCT/KR2017/010854
§ 371 (c)(1),
(2) Date: Dec. 12, 2018

(87) PCT Pub. No.: WO2018/062907
PCT Pub. Date: Apr. 5, 2018

(65) Prior Publication Data
US 2019/0215798 A1 Jul. 11, 2019

Related U.S. Application Data

(60) Provisional application No. 62/403,011, filed on Sep. 30, 2016.

(51) Int. Cl.
*H04W 68/00* (2009.01)
*H04L 5/00* (2006.01)
(Continued)

(52) U.S. Cl.
CPC ......... *H04W 68/005* (2013.01); *H04L 5/0055* (2013.01); *H04W 68/02* (2013.01); *H04W 76/27* (2018.02); *H04W 88/02* (2013.01)

(58) Field of Classification Search
None
See application file for complete search history.

(56) References Cited

U.S. PATENT DOCUMENTS 10,506,550 B2 * 12/2019 Kim .................... H04W 68/005
2015/0043455 A1 * 2/2015 Miklos .................... H04W 8/26
370/329

(Continued)

FOREIGN PATENT DOCUMENTS

| CN | 105898894 | 8/2016 |
| EP | 2725852 | 4/2014 |

(Continued)

OTHER PUBLICATIONS

LG Electronics Inc., "Discussion on paging for a lightly connected UE," R3-161930, 3GPP TSG-RAN WG3 Meeting #93, Gothenburg, Sweden, Aug. 22-26, 2016, 2 pages.

(Continued)

*Primary Examiner* — Xavier S Wong
(74) *Attorney, Agent, or Firm* — Fish & Richardson P.C.

(57) ABSTRACT

Disclosed are a method whereby a base station manages a UE context in a wireless communication system, and a device for supporting same. The method comprises the steps of: receiving paging-related information of UE from a core network node; storing the paging-related information; and carrying out paging with respect to the UE on the basis of the paging-related information after the UE has entered an RRC-inactive state.

12 Claims, 7 Drawing Sheets

(51) Int. Cl.
  *H04W 76/27* (2018.01)
  *H04W 68/02* (2009.01)
  *H04W 88/02* (2009.01)

(56) References Cited

U.S. PATENT DOCUMENTS

| | | | | |
|---|---|---|---|---|
| 2016/0135247 | A1* | 5/2016 | Ozturk | H04W 52/0212 |
| | | | | 455/436 |
| 2017/0215062 | A1* | 7/2017 | Xu | H04W 76/12 |
| 2017/0251516 | A1* | 8/2017 | Bangolae | H04W 76/27 |
| 2017/0367058 | A1* | 12/2017 | Pelletier | H04W 56/0045 |
| 2019/0082490 | A1* | 3/2019 | Zhang | H04W 8/08 |
| 2019/0239191 | A1* | 8/2019 | Zee | H04W 36/0016 |

FOREIGN PATENT DOCUMENTS

| | | | |
|---|---|---|---|
| EP | 2846589 | 3/2015 | |
| EP | 2725852 B1 * | 7/2016 | H04W 52/0222 |
| EP | 3361820 | 8/2018 | |
| WO | WO2016021870 A1 | 2/2016 | |
| WO | WO2016123809 A1 | 8/2016 | |
| WO | WO2018028677 | 2/2018 | |

OTHER PUBLICATIONS

CATT, "Discussion on RAN initiated paging," R3-161622, 3GPP TSG RAN WG3 Meeting #93, Gothenburg, Sweden, Aug. 22-26, 2016, 3 pages.

Extended European Search Report in European Application No. 17856793.9, dated Aug. 1, 2019, 10 pages.

Halbauer et al., "Architectural aspects of mm-wave radio access integration with 5G ecosystem," 5G PPP mmMAGIC, Version: 1.0, Apr. 14, 2016, 18 pages.

Nokia, "Paging and Mobility in Inactive Mode," 3GPP TSG-RAN WG3 Meeting #93, R3-161868, Aug. 22-26, 2016, 8 pages.

Qualcomm Inc., "Paging and location management in inactive mode," 3GPP TSG-RAN WG3 Meeting #93, R3-161671, Aug. 22-26, 2016, 7 pages.

European Office Action in European Application No. 17856793.9, dated May 6, 2020, 5 pages.

European Office Action in European Appln. No. 17856793.9, dated Jul. 17, 2020, 5 pages.

* cited by examiner

METHOD FOR UE CONTEXT MANAGEMENT AND DEVICE FOR SUPPORTING SAME

CROSS-REFERENCE TO RELATED APPLICATIONS

This application is a National Stage application under 35 U.S.C. § 371 of International Application No. PCT/KR2017/010854, filed on Sep. 28, 2018, which claims the benefit of U.S. Provisional Application No. 62/403,011, filed on Sep. 30, 2016. The disclosures of the prior applications are incorporated by reference in their entirety.

BACKGROUND OF THE INVENTION

Field of the Invention

The present invention relates to a technology for a base station to manage user equipment (UE) context of a UE that has entered an RRC-inactive state.

Related Art

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

A higher-layer specification defines a protocol state and specifically indicates the functions and procedures of a UE in order to consistently manage the operation state of the UE. For the standardization of NR, it is discussed to define an RRC_CONNECTED state and an RCC_IDLE state as default RRC states and to further introduce an RCC_INACTIVE state.

The RCC_INACTIVE state may be a concept similar to a lightly connected mode under discussion in LTE. The RCC_INACTIVE state is a state adopted to efficiently manage a particular UE (for example, mMTC UE). A UE in the RCC_INACTIVE state performs a radio control procedure in a similar manner to a UE in the RCC_IDLE state in order to reduce power consumption. However, the UE in the RCC_INACTIVE state maintains a connection state between the UE and a network similarly to in the RRC_CONNECTED state in order to minimize a control procedure required when transitioning to the RCC_CONNECTED state. In the RCC_INACTIVE state, a radio access resource is released, while a wired connection may be maintained.

For a UE in the RCC_INACTIVE state, an AMF may maintain the NG2 connection of an activated UE in order to hide state transitions and mobility from a next generation core (NGC). Hereinafter, a next-generation (NexGen) core CP function or CP function refers to the AMF. Here, even though receiving downlink data, an S-GW does not notify an MME (or NexGen core function CP) of the downlink data in order to trigger an S1 (or NG1) paging message.

SUMMARY OF THE INVENTION

When an anchor base station (BS) pages a UE in an RCC_INACTIVE state, the BS has a problem about how to know parameters of a particular UE, such as a paging area identity (PAI) and paging DRX. Conventionally, an MME forwards these parameters to the BS via an S1 paging message. The BS may generate a paging message on the basis of these parameters on a radio interface. However, since the MME (or next-generation core function CP) does not transmit an S1(or NG1) paging message relating to the UE in the RCC_INACTIVE state, it is difficult for the anchor BS to perform RAN-based paging using these parameters.

According to an embodiment of the present invention, there is provided a method for a BS to manage UE context in a wireless communication system, the method including: receiving paging-related information on a UE from a core network node; storing the paging-related information; and paging the UE on the basis of the paging-related information after the UE enters an RCC_INACTIVE state.

The paging-related information may be received through any one of an initial UE context setup request message, a UE context change request, a handover request, and a route change request acknowledgement (ACK) message.

The paging-related information may include at least one of a UE identity, a paging area identity (PAI) list, a tracking area identity (TAI) list, a paging DRX of a core network, paging priorities of UEs, UE radio capability for paging, paging eDRX information, NB-IoT paging eDRX information, a periodic TAU timer, a UE mobility pattern, and UE history information.

The method may further include transmitting a state change message instructing the UE corresponding to the received paging-related information to enter the RRC-inactive state after the receiving of the paging-related information.

The method may further include receiving a service request message from the UE before the receiving of the paging-related information, wherein the service request message may be transmitted to the core network node along with the paging-related information The BS may be an eNB or a gNB.

The core network node may be an MME or a next-generation core CP function (NGC AMF).

According to another embodiment, there is provided a BS for managing UE context in a wireless communication system, the BS including: a memory; a transceiver; and a processor to connect the memory and the transceiver, wherein the processor is configured to: receive paging-related information on a UE from a core network node; store the paging-related information; and page the UE on the basis of the paging-related information after the UE enters an RRC-inactive state.

The paging-related information may be received through any one of an initial UE context setup request message, a UE context change request, a handover request, and a route change request ACK message.

The paging-related information may include at least one of a UE identity, a PAI list, a TAI list, a paging DRX of a core network, paging priorities of UEs, UE radio capability for paging, paging eDRX information, NB-IoT paging eDRX information, a periodic TAU timer, a UE mobility pattern, and UE history information.

After receiving the paging-related information, the processor may be configured to transmit a state change message instructing the UE corresponding to the received paging-related information to enter the RRC-inactive state.

Before receiving the paging-related information, the processor may be configured to receive a service request message from the UE, and the service request message may be transmitted to the core network node along with the paging-related information.

The BS may be an eNB or a gNB.

The core network node may be an MME or a next-generation core CP function (NGC AMF).

ABS may receive and store UE context in advance, thus easily paging a UE after the UE enters the RCC_INACTIVE state.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE. 5G communication system is an evolution of the LTE-A.

For clarity, the following description will focus on the LTE-A/5G. However, technical features of the present invention are not limited thereto.

Figure 1:
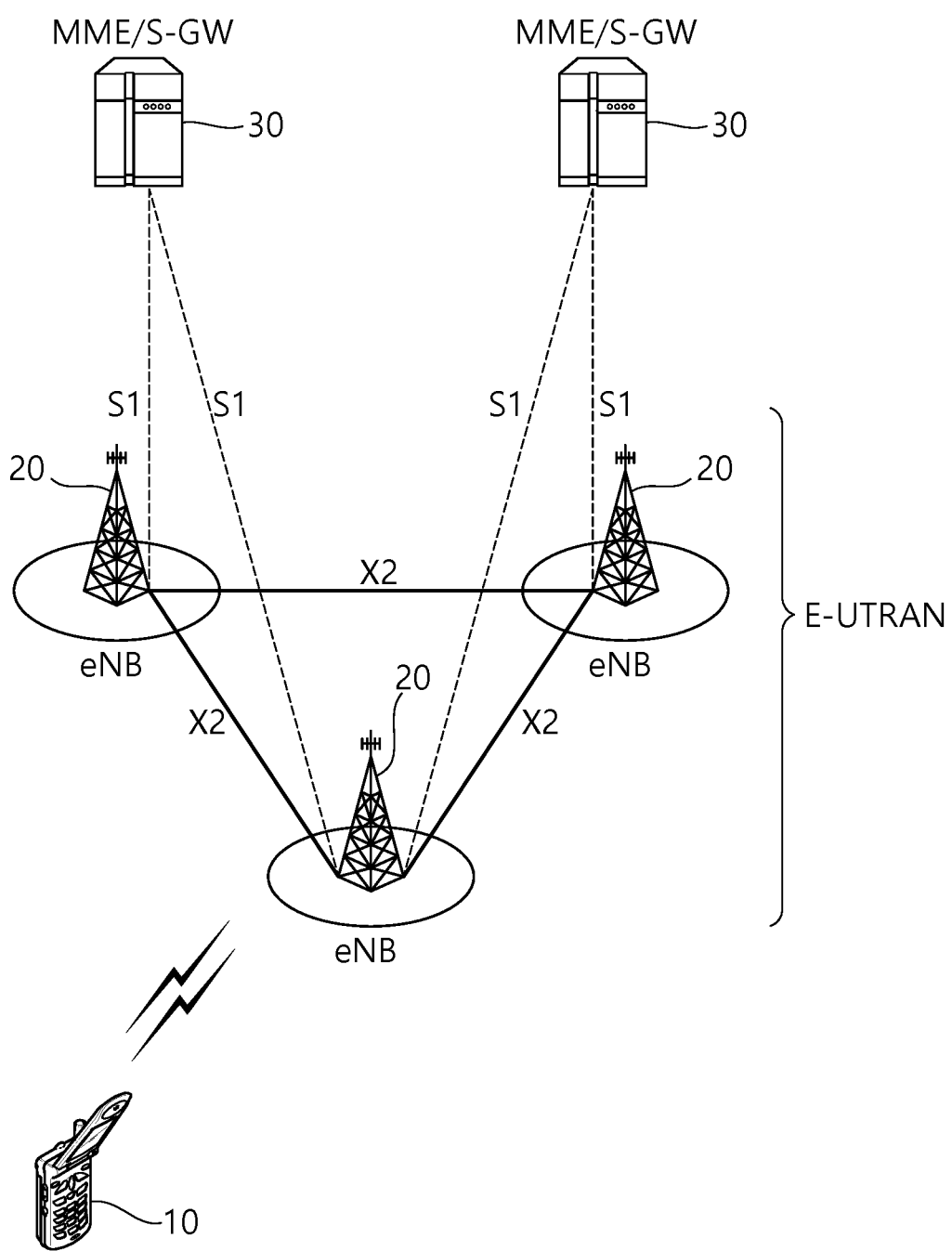
FIG. 1 shows the architecture of an LTE system.

FIG. 1 shows the architecture of an LTE system. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include one or more evolved node-Bs (eNBs) 20, and a plurality of UEs may be located in one cell. An E-UTRAN system is an evolved system from an existing URAN system, which may be, for example, a 3GPP LTE/LTE-A system. The E-UTRAN includes base stations (eNBs) that provide control-plane and user-plane protocols to a UE, and the base stations (BSs) are connected via an X2 interface. An X2 user-plane interface (X2-U) is defined between BSs. The X2-U provides non-guaranteed delivery of a user-plane packet data unit (PDU). An X2 control-plane interface (X2-CP) is defined between two neighboring BSs. The X2-CP performs the functions of delivering context between the BSs, controlling a user-plane tunnel between a source BS and a target BS, delivering a handover-related message, and uplink load management. ABS is connected to a UE through a wireless interface and is connected to the EPC through an S1 interface. An S1 user-plane interface (S1-U) is defined between a BS and a serving gateway (S-GW). An S1 control-plane interface (S1-MME) is defined between a BS and a mobility management entity (MME). The S1 interface performs an evolved packet system (EPS) bearer service management function, a non-access stratum (NAS) signaling transport function, a network sharing function, and an MME load balancing function. The S1 interface supports many-to-many-relations between the BS and the MME/S-GW.

The eNB 20 provides an end point of a control plane and a user plane to the UE. The eNB 20 generally refers to a fixed station that communicates with the UE 10 and may be referred to as another term, such as a base station (BS), a base transceiver system (BTS), an access point, and the like. One eNB 20 may be deployed per cell. There are one or more cells within the coverage of the eNB 20. A single cell may be configured to have one bandwidth among 1.25, 2.5, 5, 10, and 20 MHz and may provide downlink or uplink transmission services to a plurality of UEs. Here, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
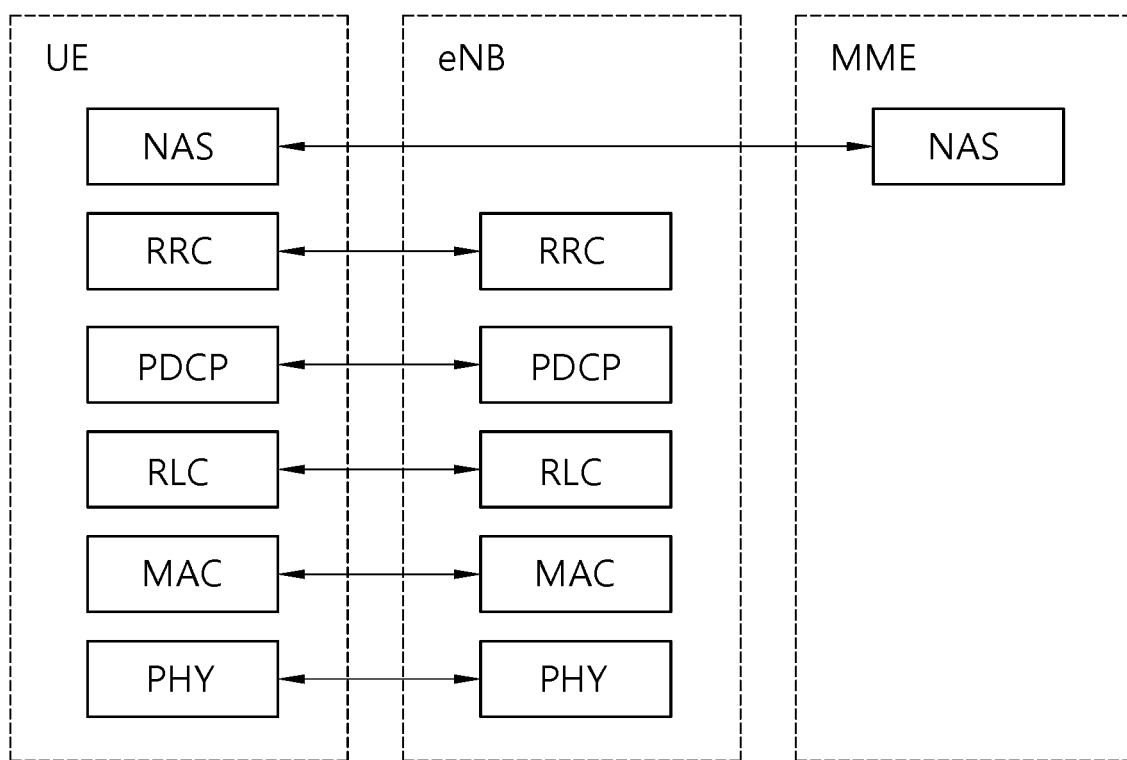
FIG. 2 shows a block diagram of a control plane protocol stack of an LTE system.
Figure 3:
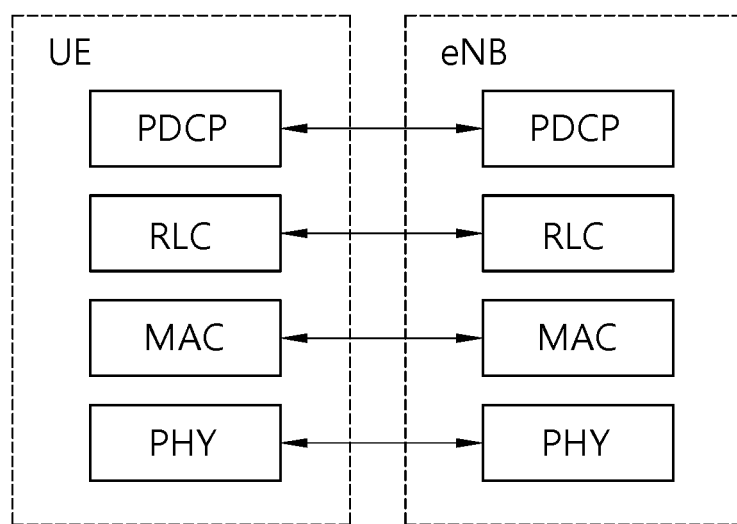
FIG. 3 shows a block diagram of a user plane protocol stack of an LTE system.

FIG. 2 shows a block diagram of a control plane protocol stack of an LTE system, and FIG. 3 shows a block diagram of a user plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer above the RRC layer performs functions, such as session management and mobility management.

Hereinafter, a 5G network structure is described.

Figure 4:
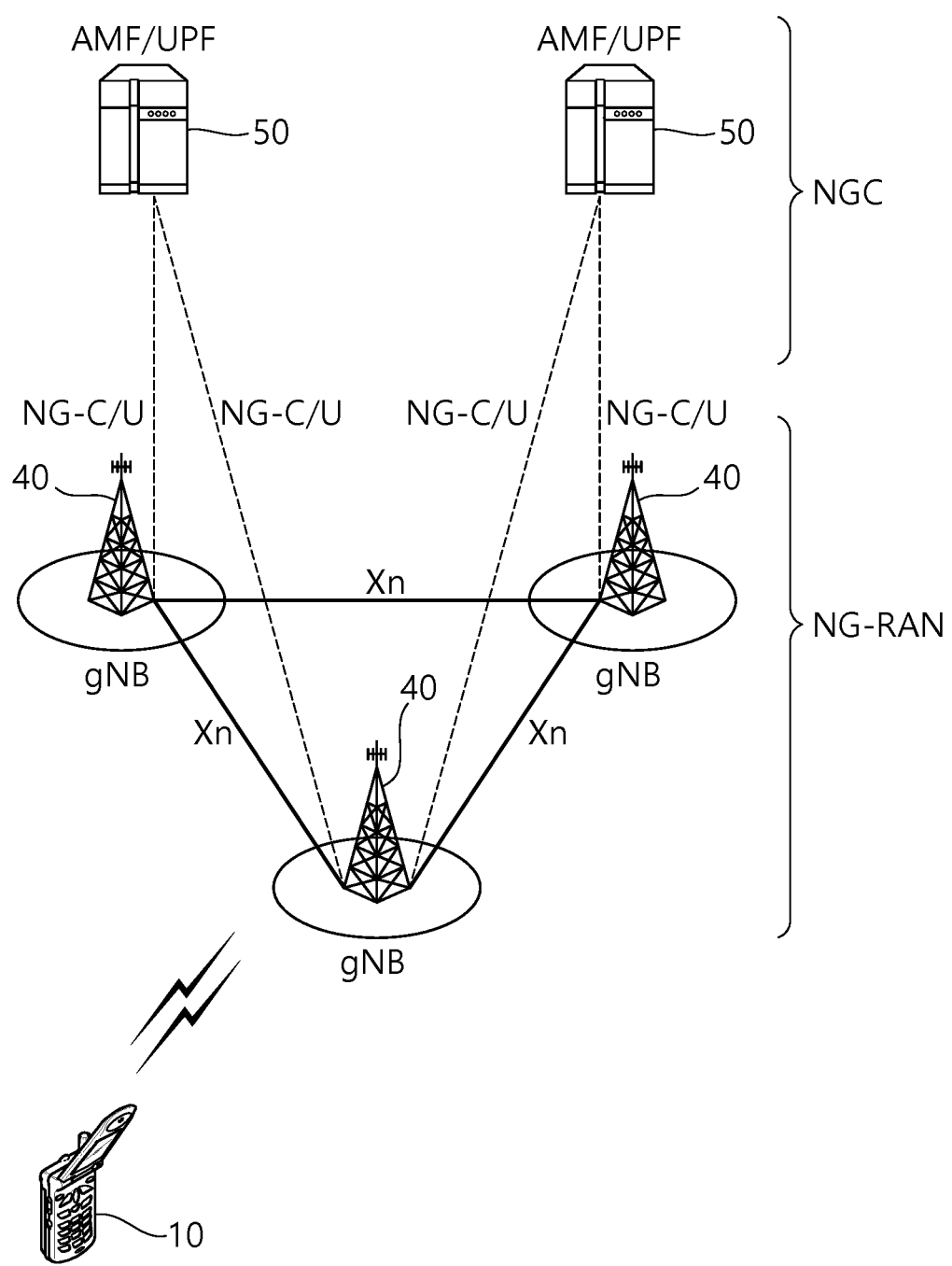
FIG. 4 shows the architecture of a 5G network.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RCC_INACTIVE state of a UE is described.

In the discussion on the NR standardization, an RCC_INACTIVE state (RRC inactive state) has been newly introduced in addition to the existing RRC_CONNETED state and RCC_IDLE state. The RCC_INACTIVE state may be a concept similar to a lightly connected mode which is under discussion in LTE. The RCC_INACTIVE state is a state introduced to efficiently manage a specific UE (for example, mMTC UE). A UE in the RCC_INACTIVE state performs a radio control procedure similarly to a UE in the RCC_IDLE state in order to reduce power consumption. However, the UE in the RCC_INACTIVE state maintains a connection state between the UE and a network similarly to the RRC_CONNECTED state in order to minimize a control procedure required when transitioning to the RRC_CONNECTED state. In the RCC_INACTIVE state, a radio access resource is released, but wired access may be maintained. For example, in the RCC_INACTIVE state, the radio access resource is released, but an NG2 interface between a gNB and am NGC or an S1 interface between an eNB and an EPC may be maintained. In the RCC_INACTIVE state, a core network recognizes that the UE is normally connected to a BS. On the other hand, the BS may not perform connection management for the UE in RRC_INACTIVE state.

In case of a UE in a lightly connected mode, an MME may maintain an S1 connection of the activated UE to hide mobility and state transitions from a core network. In other words, in case of a UE in the RCC_INACTIVE state, an AMF may maintain an NG2 connection of the activated UE to hide mobility and state transitions from a next generation core (NGC). Meanwhile, in the present description, a next generation (NexGen) core CP function or a CP function refers to the AMF. In this scenario, when the downlink data arrives, the S-GW does not send to the MME/NexGen Core CP function the DOWNLINK DATA NOTIFICATION message to trigger the S1/NG1 PAGING message. This is because the S1 (or NG1) connection is always maintained in the RRC disabled state, so no separate paging procedure is required. The S-GW just sends the data to the anchor eNB/gNB directly. The anchor eNB/gNB then buffers the received DL data, decides which cells to page, and triggers the paging over Uu/NG3 interface.

In this case, however, when the anchor eNB (or gNB) pages a UE, the eNB (or gNB) has a problem about how to know parameters of a particular UE, such as a paging area identity (PAI) and paging DRX. Conventionally, an MIME forwards these parameters to the eNB via an S1 paging message. The eNB may generate a paging message on the basis of these parameters on a radio interface. However, since the MIME (or next-generation core function CP) does not transmit an S1 (or NG1) paging message relating to the UE in the RCC_INACTIVE state, it is difficult for the anchor eNB (or gNB) to perform RAN-based paging using these parameters.

To solve the foregoing problem, the present invention proposes a technology for managing UE context. In this description, a gNB denotes a BS in NR, and NG1 denotes an interface between a UE and a CP function of NR. NG2 denotes an interface between a gNB and a CP function of NG, NG3 denotes an interface between a LTE and a gNB, and NG4 denotes an interface between gNBs. Further, a BS may be an eNB or a gNB, and a core network node may be an MME or a next-generation core CP function (NGC AMF). However, these terms are divided according to the above-mentioned operations and functions and may be changed depending on cases.

According to an embodiment of the present invention, a core network node provides information on a particular UE, such as a tracking area identity (TAI), paging DRX of a core network, and a paging area identity (PAI), to an anchor BS. The anchor BS may receive and store this information, and may retain these parameters even when a UE enters the RCC_INACTIVE state. When there is downlink data to be transmitted to the UE in the lightly connected mode, the anchor BS may initiate RAN-based paging on the basis of these parameters.

Figure 5:
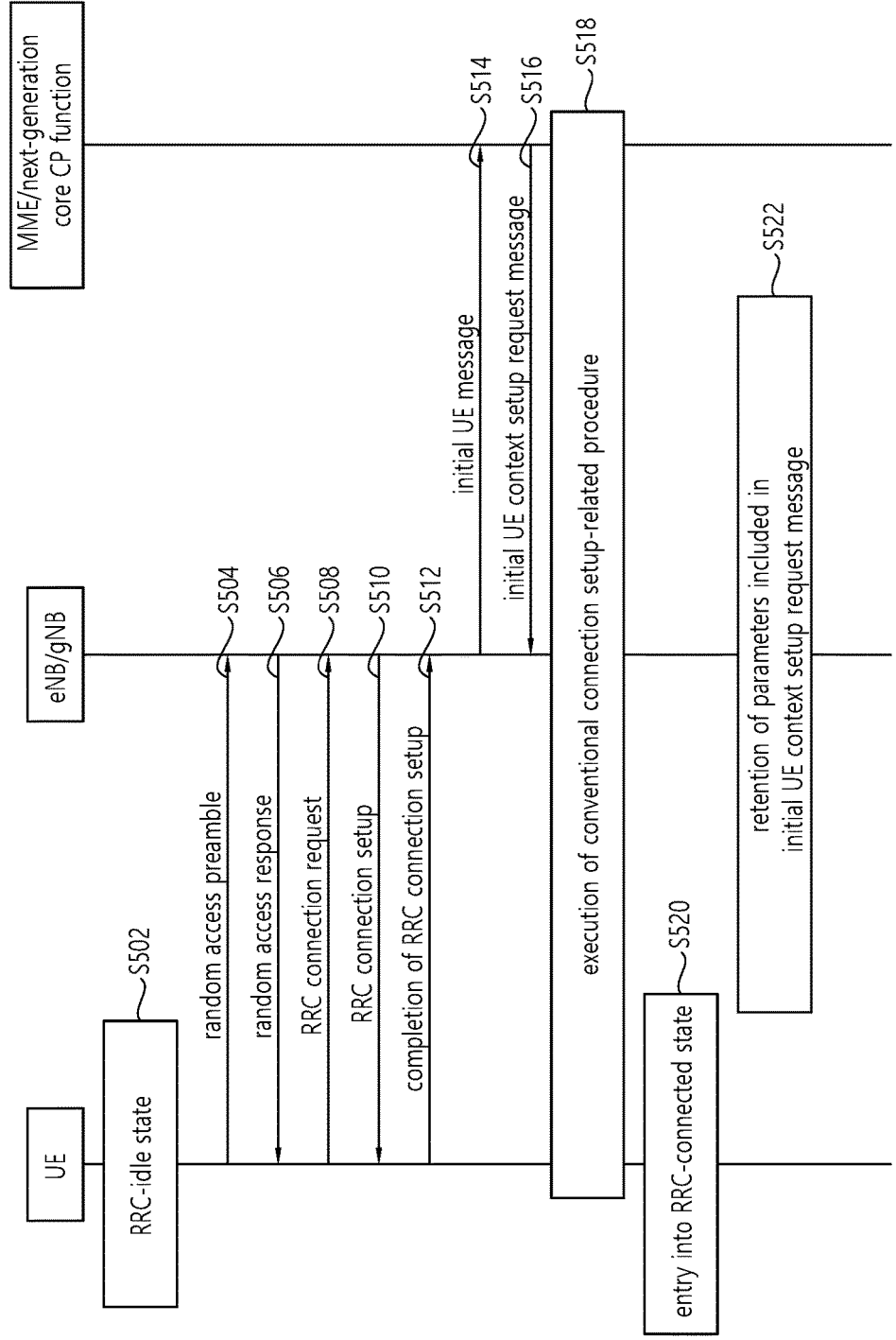
FIG. 5 is a flowchart illustrating a method for managing UE context according to an embodiment of the present invention.

FIG. 5 is a flowchart illustrating a method for managing UE context according to an embodiment of the present invention.

In step S502, a UE may be in the RCC_IDLE state.

In step S504, the UE may transmit a random access preamble to a BS. Accordingly, the LE initiates a procedure for setting up an RRC connection with the BS.

In step S506, the BS may transmit a random access response to the UE.

In step S508, the UE may transmit an RRC connection request message to the BS.

In step S510, the BS may transmit an RRC connection setup message to the UE.

In step S512, the UE n ay transmit an RRC connection setup complete message to the BS. Here, the RRC connection setup complete message may include a service request message.

In step S514, the BS may transmit an initial UE message to a core network node. The initial UE message may include the service request message. That is, the BS may forward the service request message to the core network node through the initial UE message.

In step S516, the core network node may transmit an initial UE context setup request message to the BS. The initial UE context setup request message is used to establish generally necessary initial UE context of the UE and may include paging-related information for each UE. According to one embodiment, the initial UE context setup request message may include at least one of the following information.

UE identity
Paging area identity (PAI) list
Tracking area identity (TAI) list
UE paging ID
Paging DRX on core network
Paging priorities of UEs
UE radio capability for paging
Paging eDRX information
NB-IoT paging eDRX information
Periodic tracking area update (TAU) tuner
UE mobility pattern
UE history information The BS may store the received initial UE context setup request message. Also, the BS may apply the stored initial UE context setup request message to a particular process during a paging procedure. That is, the BS may receive the initial UE context setup request message from the core network node and may store the initial UE context setup request message before the UE enters the RCC_INACTIVE state from the RRC_CONNECTED state. However, the foregoing information may be received from the core network node not only through the initial LTE context setup request message but also through any one of a UE context change request, a handover request, and a route change request acknowledgment (ACK) message.

The core network node may transmit the initial UE context setup request message to the BS, thereby indicating that the LTE can enter the RRC_INACTIVE state. Specifically, when receiving the initial UE context setup request message, the BS can recognize that the UE may enter the RRC_INACTIVE state. That is, the initial UE context setup request message may be transmitted by the core network node to the BS only for UEs that may enter the RRC_INACTIVE state.

In step S518, a conventional connection setup procedure is performed.

In step S520, the UE may enter the RRC_CONNECTED state.

The BS may transmit, to the UE, a state change message instructing the UE to enter the RRC_INACTIVE state. This state change message may be transmitted by the BS to the LTE when a conventional condition for entering the RRC_INACTIVE state is satisfied. For example, when a UE does not transmit uplink data or downlink data is not detected for a predetermined time, the BS may transmit a state change message to the UE. The state change message may include information on how often a check message needs to be sent after the UE enters the RRC_INACTIVE state. Specifically, the BS may perform a RAN-based location area update (RLAU) procedure to verify whether the UE having entered the RRC_INACTIVE state is staying well in an RAN paging area. In this procedure, the BS may set a timer used in the RLAU procedure, and the UE may periodically report to the BS that the UE is staying in the RAN paging area according to the timer used in the RLAU procedure. The timer used in the RLAU procedure may be set on the basis of a TAU timer described above. For example, the BS may receive a TAU timer from the core network node and may set the timer used in the RLAU procedure to a value less than or equal to that of the received TAU timer. Here, the BS may transmit the state change message only to a UE indicated by the initial UE context setup request message received from the core network node, instead of transmitting the state change message to all UEs that satisfy the condition for entering the RRC_INACTIVE state.

In step S522, when the UE enters the RRC_INACTIVE state, the BS may retain the parameters received in step S516 as they are. Therefore, when downlink data to be transmitted to the UE in the RCC_INACTIVE state is detected, the BS may perform RAN-based paging of the UE using the stored parameters.

While the UE is in the RRC_INACTIVE state, the BS may maintain the S1 (or NG1) connection. A PAI refers to an area set by the BS, and the UE does not need to update the location thereof for the BS.

Figure 6:
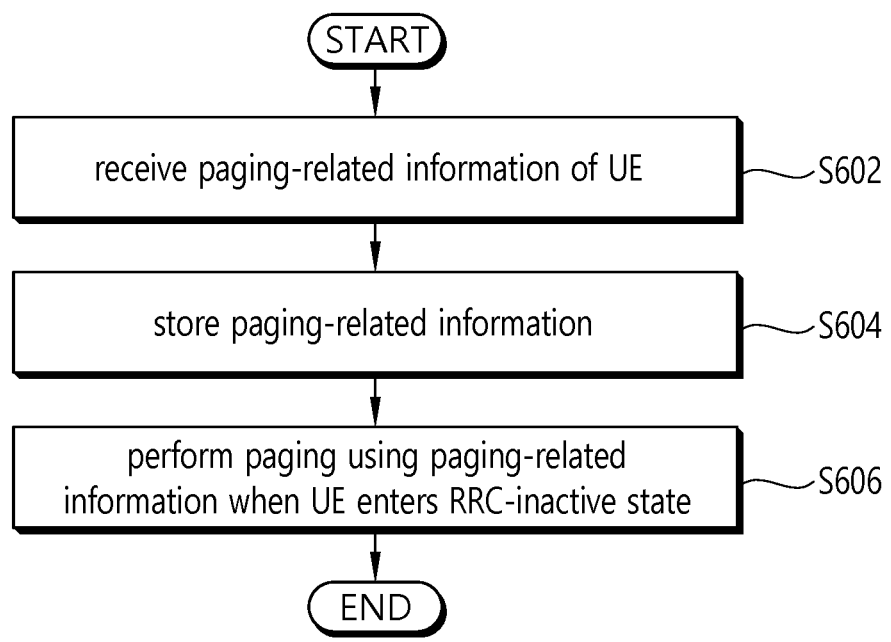
FIG. 6 is a flowchart illustrating a method for managing UE context according to an embodiment of the present invention.

FIG. 6 is a flowchart illustrating a method for managing UE context according to an embodiment of the present invention. In the present embodiment, a BS may be an eNB or a gNB. In addition, a core network node may be an MME or a next-generation core CP function.

In step S602, the BS may receive paging-related information on a UE from the core network node. The paging-related information is information corresponding to UE context and may be transmitted to the core network node through any one of an initial UE context setup request message, a UE context change request, a handover request, UE a route change request ACK message.

The paging-related information may include at least one of a LTE identity, a PAI list, a TAI list, a paging DRX of a core network, paging priorities of UEs, LE radio capability for paging, paging eDRX information, NB-IoT paging eDRX information, a periodic TAU timer, a UE mobility pattern, and UE history information.

Before receiving the paging-related information, the BS may receive a service request message from the UE, and the service request message may be transmitted to the core network node along with the paging-related information.

After receiving the paging-related information from the core network node, the BS may transmit a state change message instructing the UE corresponding to the received paging-related information to enter the RCC_INACTIVE state. That is, the BS may transmit the state change message only to a UE on which the paging-related information is received among UEs that satisfy a condition for entering the RCC_INACTIVE state.

In step S604, the BS may store the paging-related information on the UE received from the core network node.

In step S606, the BS may page the UE on the basis of the paging-related information after the UE enters the RCC_INACTIVE state. That is, the BS may receive and store the paging-related information on the UE that is received in the RRC connection establishment process of the UE. Then, when the UE enters the RCC_INACTIVE state, the BS may page the UE using the paging-related information.

Figure 7:
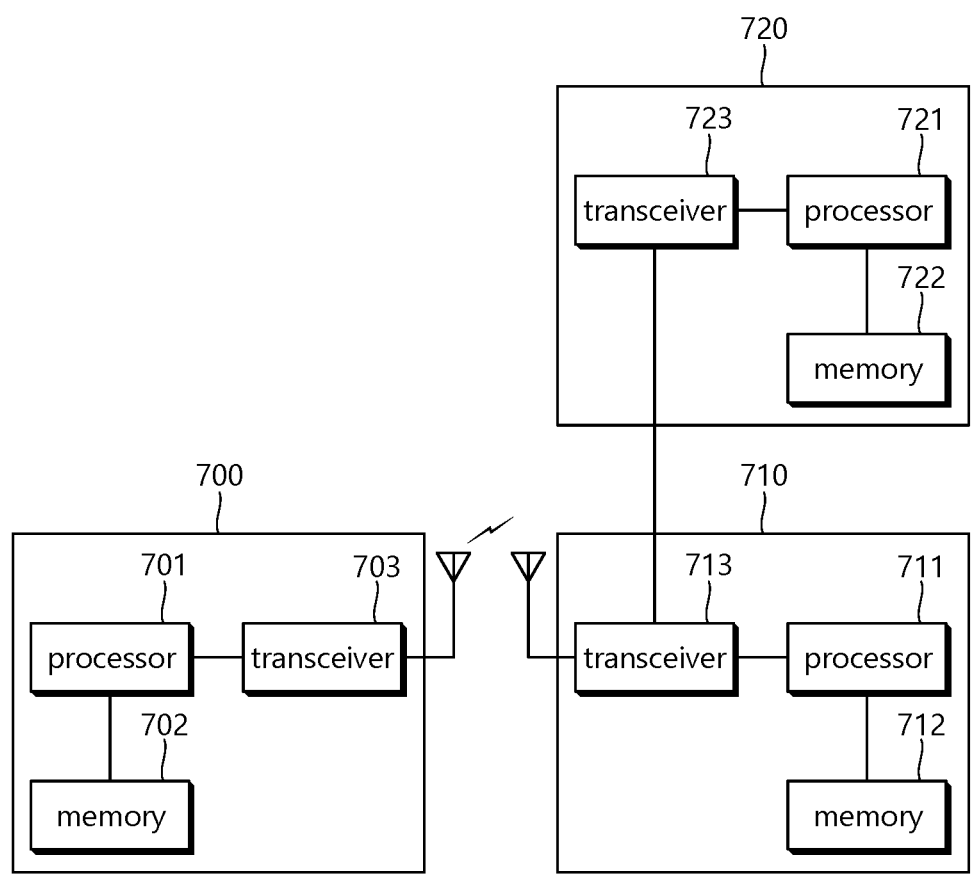
FIG. 7 shows a wireless communication system to implement an embodiment of the present invention.

FIG. 7 is a block diagram illustrating a wireless apparatus in which an embodiment of the present invention can be implemented.

ABS 700 includes a processor 701, a memory 702, and a transceiver 703. The memory 702 is coupled to the processor 701, and stores a variety of information for driving the processor 701. The transceiver 703 is coupled to the processor 701, and transmits and/or receives a radio signal. The processor 701 implements the proposed functions, procedures, and/or methods. In the aforementioned embodiments, an operation of the BS may be implemented by the processor 701.

A UE 710 includes a processor 711, a memory 712, and a transceiver 713. The memory 712 is coupled to the processor 711, and stores a variety of information for driving the processor 711. The transceiver 713 is coupled to the processor 711, and transmits and/or receives a radio signal. The processor 61 implements the proposed functions, procedures, and/or methods. In the aforementioned embodiments, an operation of the UE 710 may be implemented by the processor 711.

The MME/AMF 720 includes a processor 721, a memory 722 and a transceiver 723. The memory 722 is coupled to the processor 721 to store various information for driving the processor 721. Transceiver 723 is coupled to processor 721 to transmit and/or receive wireless signals. Processor 721 implements the proposed functionality, process and/or method. In the above-described embodiment, the operation of the MME/AMF can be implemented by the processor 721.

The processors may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for managing, by a base station (BS), user equipment (UE) context in a wireless communication system, the method comprising:
    receiving an initial context setup request message including information for an inactive state on a UE from a core network node, wherein the information for the inactive state includes a tracking area identity (TAI) for a UE and an identity of the UE;
    storing the information for the inactive state; and
    after the UE enters the inactive state, initiating a radio access network (RAN) paging procedure for the UE in a paging area based on the stored information for the inactive state.

2. The method of claim 1, wherein the initial context setup request message comprises information on at least one of, a paging discontinuous reception (DRX) of a core network, a periodic tracking area update (TAU) timer, a UE mobility pattern, or UE history information.

3. The method of claim 1, wherein the UE enters the inactive state by transmitting a state change message after receiving the initial context setup request message.

4. The method of claim 1, further comprising receiving a service request message from the UE before receiving the initial context setup request message.

5. The method of claim 1, wherein the BS is an evolved Node B eNB or a next generation Node B gNB.

6. The method of claim 1, wherein the core network node is a Mobility Management Entity MME or a next-generation core CP function (NGC AMF).

7. A base station (BS) configured to manage user equipment (UE) context in a wireless communication system, the BS comprising:
    a memory;
    a transceiver; and
    a processor to connect the memory and the transceiver, wherein the processor is configured to:
    receive an initial context setup request message including information for an inactive state from a core network node, wherein the information for the inactive state includes a tracking area identity (TAI) for a UE and an identity of the UE;
    store the information for the inactive state; and
    after the UE enters the inactive state, initiate a radio access network (RAN) paging procedure for the UE in a paging area based on the stored information for the inactive state.

8. The BS of claim 7, wherein the initial context setup request message comprises information on at least one of a paging discontinuous reception (DRX) of a core network, a periodic tracking area update (TAU) timer, a UE mobility pattern, and UE history information.

9. The BS of claim 7, wherein the UE enters the inactive state by transmitting a state change message.

10. The BS of claim 7, wherein before receiving the initial context setup request message, the processor is configured to receive a service request message from the UE.

11. The BS of claim 7, wherein the BS is an evolved Node B eNB or a next generation Node B gNB.

12. The BS of claim 7, wherein the core network node is a Mobility Management Entity MME or a next-generation core CP function (NGC AMF).

* * * * *